United States Patent [19]

Lee

[11] Patent Number: 5,796,181
[45] Date of Patent: Aug. 18, 1998

[54] ALTERNATING CURRENT GENERATOR CONTROL APPARATUS FOR VEHICLE

[75] Inventor: Yong-Chul Lee, Kyongju, Rep. of Korea

[73] Assignee: Mando Machinery Corporation, Kyunggi-do, Rep. of Korea

[21] Appl. No.: 780,383

[22] Filed: Jan. 8, 1997

[30] Foreign Application Priority Data

Sep. 6, 1996 [KR] Rep. of Korea ............... 1996-38610

[51] Int. Cl.$^6$ ...................................................... H02P 9/00
[52] U.S. Cl. ........................... 307/10.8; 322/99; 340/455
[58] Field of Search .................. 307/9.1, 10.1, 307/10.7, 10.8, 157, 127, 138; 361/82, 84; 315/77, 78; 340/455; 320/48, 43, DIG. 1, 137; 322/62–64, 99, DIG. 2; 290/16

[56] References Cited

U.S. PATENT DOCUMENTS

| | | |
|---|---|---|
| 5,105,143 | 4/1992 | Marumoto et al. |
| 5,140,253 | 8/1992 | Itoh. |
| 5,260,641 | 11/1993 | Iwatani. |
| 5,264,779 | 11/1993 | Satoh et al. |
| 5,448,154 | 9/1995 | Kanke et al. |
| 5,539,610 | 7/1996 | Williams et al. ............... 307/10.7 |
| 5,642,251 | 6/1997 | Lebbolo et al. ............... 361/84 |

*Primary Examiner*—Richard T. Elms
*Attorney, Agent, or Firm*—Wyatt, Gerber, Meller & O'Rourke

[57] ABSTRACT

An improved alternating current generator control apparatus for a vehicle which is capable of preventing a lamp driving transistor from being damaged due to an over-current by controlling the current of the lamp driving transistor connected to an L-terminal when reversely connecting the L-terminal and an S-terminal connected to an external connector. The apparatus includes an alternating current generator having a field coil, a voltage controller for maintaining the voltage generated by the alternating current generator to a predetermined level, a charging lamp for indicating whether a voltage is generated, a lamp driving unit for turning on and turning off the charging lamp, a battery for providing an initial driving voltage to the alternating current generator, an ignition switch for driving an engine of a vehicle, an initial excitation current supply transistor for supplying an initial excitation current, and a lamp driving controller for controlling a current of the lamp driving transistor of the lamp driving unit.

1 Claim, 2 Drawing Sheets

ALTERNATING CURRENT GENERATOR CONTROL APPARATUS FOR VEHICLE

BACKGROUND OF THE INVENTION

1. Field of the Invention

The present invention relates to an alternating current generator control apparatus for a vehicle, and in particular to an improved alternating current generator control apparatus for a vehicle which is capable of preventing a lamp driving transistor from being damaged due to an over-current by controlling the current of the lamp driving transistor connected to an L-terminal when reversely connecting the L-terminal and an S-terminal connected to an external connector.

2. Description of the Conventional Art

FIG. 1 is a circuit diagram illustrating a conventional alternating current generator control apparatus for a vehicle.

As shown therein, the conventional alternating current generator control apparatus for a vehicle includes an alternating current generator 1 for generating a voltage, a field coil 2 for causing the alternating current generator 1 to generate a voltage, a voltage controller 3 for maintaining the voltage generated by the alternating current generator 1 at a predetermined level, a charging lamp 4 for indicating whether the voltage is generated, a battery 6 for outputting an initial driving voltage to the alternating current generator 1, an ignition switch 7 for driving an engine of a vehicle, and an initial excitation current supply transistor Q5 for supplying an initial excitation current.

The operation of the conventional alternating current generator control apparatus for a vehicle will now be explained with reference to FIG. 1.

First, when the ignition switch 7 is turned on, a base current is applied to the initial excitation current supply transistor Q5 through an initial excitation resistor R9, so that the current is applied to the transistor Q5. Therefore, an initial excitation current is applied to the excitation coil 2 of the alternating current generator 1.

Here, the base current is applied to the lamp driving transistor Q4 through the resistor R8 of the lamp driving unit 5, and the charging lamp 4 is turned on.

Thereafter, as the current is applied to the field coil 2, the rotor of the alternating current generator 1 is rotated, for generating voltage. A voltage is generated at a T-terminal, and the transistor Q3 is turned on through a voltage divider resistor R6, a diode D2, and a Zener diode ZD2 of the lamp driving unit 5, and the lamp driving transistor Q4 is turned off, and the charging lamp 4 is turned off.

In addition, when the voltage generated by the alternating current generator 1 is increased, and exceeds a predetermined set level, the voltage detected at the S-terminal causes the transistor Q2 to be turned on through the voltage divider resistors R4 and R5 and the Zener diode ZD1 of the voltage controller 3, and causes the transistor Q1 to be turned off, the current is not applied through the field coil 2, so that the voltage generation is reduced.

In addition, when the voltage is lowered below a predetermined set level, the voltage detected at the S-terminal is applied through the Zener diode ZD1 of the voltage controller 3, and causes the transistor Q2 to be turned off. Thereafter, the transistor Q1 is turned on, and the current is applied through the field coil 2, for thus increasing the voltage generation level.

The voltage generation is maintained by the alternating current generator 1 through the above-described processes.

However, the conventional alternating current control apparatus has disadvantages in that the voltage generation is constantly maintained when normally connecting the L-terminal and S-terminal; however, when the L-terminal and S-terminal are reversely connected, the current amount of the lamp driving transistor Q4 of the lamp driving unit 5 connected to the L-terminal is increased due to the voltage of the battery 6, for thus damaging the transistor Q4 due to over current applied thereto.

Therefore, the charging lamp 4 is not turned on due to the damage of the lamp driving transistor Q4, and the charging lamp 4 is always turned off, so that it is impossible to perform a desired alarm function when the voltage generation is not performed in the system.

SUMMARY OF THE INVENTION

Accordingly, it is an object of the present invention to provide an alternating current generator control apparatus for a vehicle which overcomes the problems encountered in the conventional art.

It is another object of the present invention to provide an improved alternating current generator control apparatus for a vehicle which is capable of restricting the amount of the current supplied to a lamp driving transistor connected to an L-terminal by using a thyristor when an L-terminal and the S-terminal are reversely connected, so that it is possible to prevent the transistor from being damaged due to an over-current supplied thereto, and to operate the system normally when the problems is avoided.

To achieve the above objects, there is provided an improved alternating current control apparatus for a vehicle which includes an alternating current generator having a field coil, a voltage controller for maintaining the voltage generated by the alternating current generator to a predetermined level, a charging lamp for indicating whether a voltage is generated, a lamp driving unit for turning on and turning off the charging lamp, a battery for providing an initial driving voltage to the alternating current generator, an ignition switch for driving an engine of a vehicle, an initial excitation current supply transistor for supplying an initial excitation current, and a lamp driving controller for controlling a current of the lamp driving transistor of the lamp driving unit, wherein the lamp driving controller includes a current detection resistor connected to the emitter of the lamp driving transistor for detecting a lamp driving current of the transistor when an L-terminal and an S-terminal are reversely connected, and a thyristor for urging the voltage of the battery of the S-terminal to be supplied to the ground in accordance with the voltage supplied to the gate when an over-current is detected in the lamp driving transistor by the current detection resistor.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
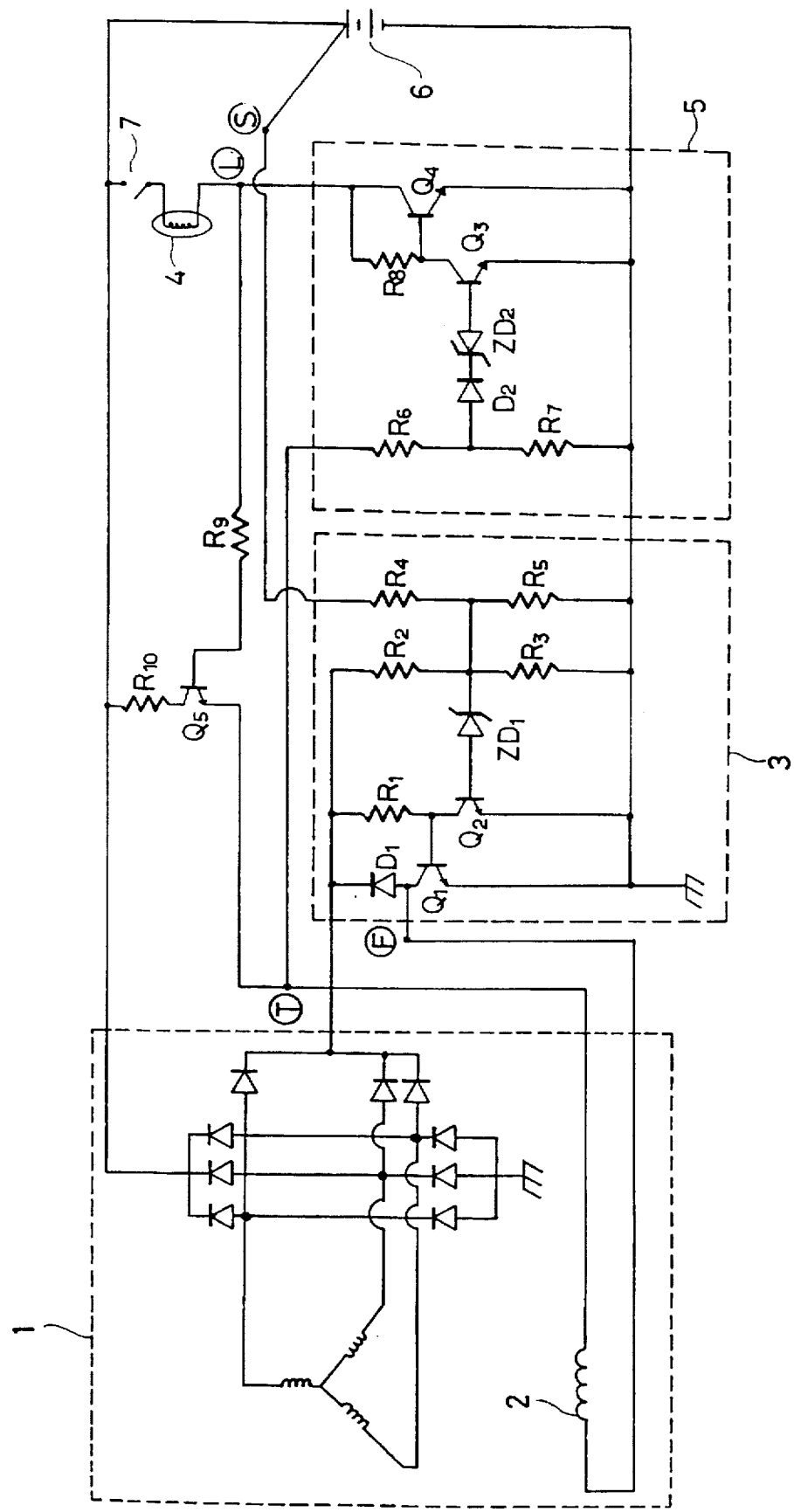
FIG. 1 is a circuit diagram illustrating a conventional alternating current generator control apparatus for a vehicle.
Figure 2:
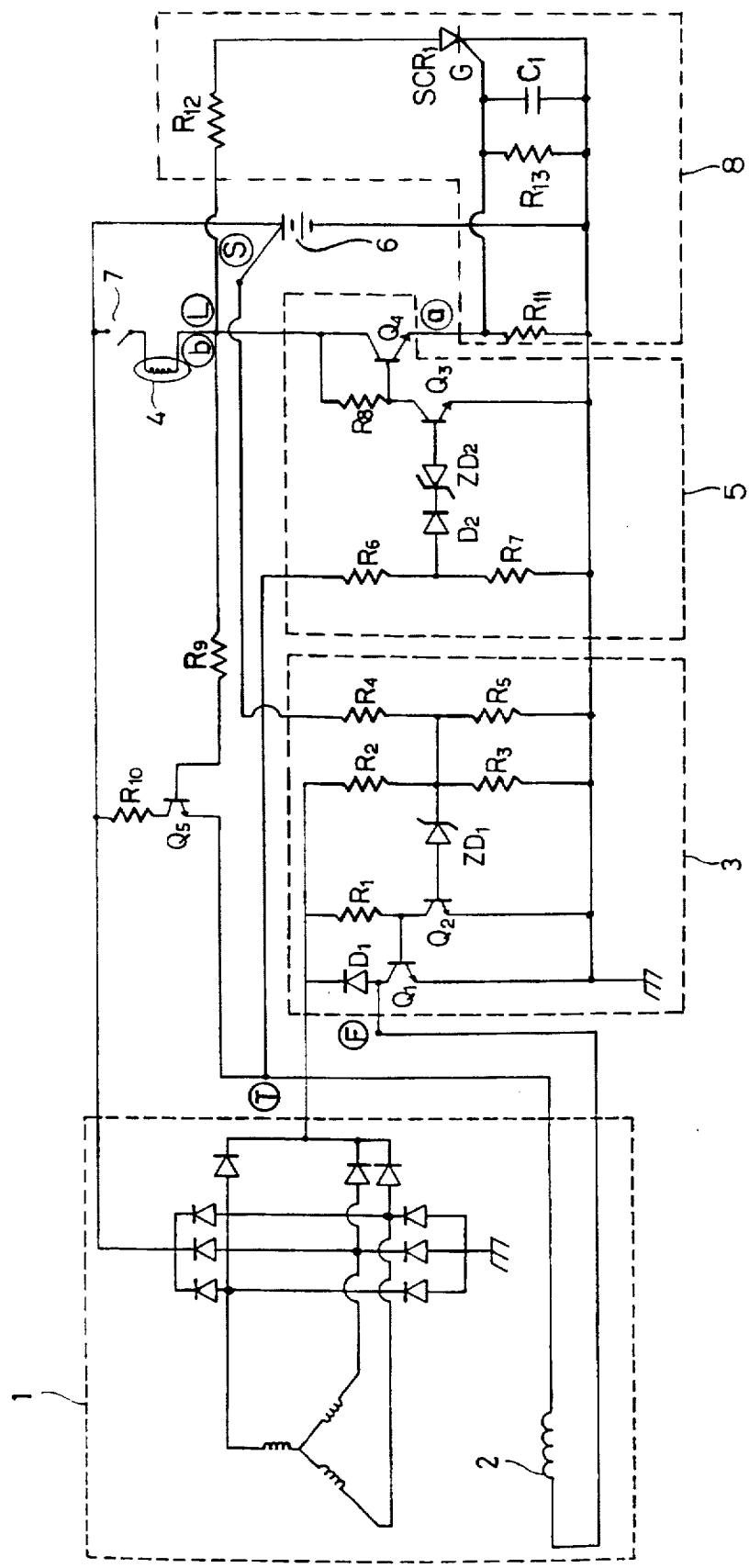
FIG. 2 is a circuit diagram illustrating an alternating current generator control apparatus for a vehicle according to the present invention.

FIG. 2 is a circuit diagram illustrating an alternating current generator control apparatus for a vehicle according to the present invention.

As shown therein, the alternating current voltage generator control apparatus according to the present invention includes an alternating current generator 1 having a field coil 2, a voltage controller 3 for controlling the voltage generation by the alternating current generator 1 constantly, a charging lamp 4 for indicating whether the voltage generation is performed, a lamp driving unit 5 for turning on or turning off the charging lamp 4, a battery 6 for providing an initial driving voltage to the alternating current generator 1, an ignition switch 7 for driving the engine of a vehicle, an initial excitation current supply transistor Q5 for supplying an initial excitation current, and a lamp driving controller 8 for controlling the current of the lamp driving transistor Q4 of the lamp driving unit 5.

The lamp driving controller 8 is basically directed to control the over current of the lamp driving transistor Q4 of the lamp driving unit 5 when reversely connecting an L-terminal and an S-terminal.

The lamp driving controller 8 includes a current detection resistor R11 connected to the emitter of the lamp driving transistor Q4 for detecting the lamp driving current of the transistor Q4, and a thyristor SCR1, resistors R12 and R13, and a condenser C1 which are operated in order for the voltage of the battery 6 of the S-terminal to be connected to the ground in accordance with the voltage supplied to the gate when the over current is detected in the lamp driving transistor Q4 by the current detection resistor R11.

The operation of the alternating current generator control apparatus for a vehicle according to the present invention will now be explained with reference to FIG. 2.

First, when the ignition switch 7 is turned on so as to supply an initial excitation current, the base current is applied to the initial excitation current supply transistor Q5 through the ignition switch 7, the charging lamp 4, and the initial excitation current resistor R9. Therefore, an excitation current is supplied from the field coil 2 to the transistor Q1 of the voltage controller 3 through the transistor Q5.

In addition, the charging lamp 4 is turned on when the base current is supplied to the lamp driving transistor Q4 through the resistor R8 of the lamp driving unit 5.

Thereafter, when the alternating current generator 1 is driven, the transistor Q3 of the lamp driving unit 5 is turned on by the voltage generated in the T-terminal, the lamp driving transistor Q4 is turned off, and the charging lamp 4 is turned off.

When the voltage generated by the generator exceeds a predetermined set level, the voltage detected at the S-terminal is divided by the resistors R4 and R5 of the voltage controller 3 and is supplied to the Zener diode ZD1, and then the transistor Q2 is turned on, and the transistor Q1 is turned off, so that the current is not supplied to the field coil 2, for thus decreasing the voltage generation.

On the other hand, when the voltage generation is decreased below a predetermined set level, the current is not supplied to the Zener diode ZD1. Therefore, the transistor Q2 is turned off, and the transistor Q1 is turned on, so that the current is applied to the field coil 2, for thus maintaining the voltage generation of the generator below a predetermined set level.

The above-described processes are repeatedly performed in the case that the L-terminal and S-terminal are normally connected.

Next, when the L-terminal and S-terminal are reversely connected, namely, the L-terminal is changed to the S-terminal, and the S-terminal is changed to the L-terminal, since the voltage of the battery is supplied to a point "b", the amount of the current supplied to the lamp driving transistor Q4 of the lamp driving unit 5 is increased.

When the amount of the current supplied to the lamp driving transistor Q4 is increased, the potential at a point "a" detected by the current detection resistor R11 is increased, and the high potential voltage is supplied to the gate "G" of the thyristor SCR1, so that the thyristor SCR1 is turned on, and the current is supplied thereto.

As the current is supplied to the thyristor SCR1, the current is not supplied to the lamp driving transistor Q4 at the point "b", and the current is supplied to the ground through the thyristor SCR1, so that the over-current is not supplied to the transistor Q4, for thus preventing the transistor Q4 from being damaged.

As described above, the alternating current generator control apparatus for a vehicle according to the present invention is basically directed to preventing the over-current from being supplied to the lamp driving transistor Q4 when reversely connecting the L-terminal and S-terminal by using the thyristor SCR1, for thus more effectively preventing the damage of the transistor Q4, whereby it is possible to perform a desired alarm function of the alternating current generator by using the charging lamp.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An alternating current generator control apparatus for a vehicle having a ground, comprising:

an alternating current generator having a field coil;

a voltage controller for maintaining the voltage generated by the alternating current generator to a predetermined level;

a charging lamp for indicating whether a voltage is generated;

a lamp driving unit for turning on and turning off the charging lamp, said lamp driving unit having a lamp driving transistor connected to an L-terminal;

a battery for providing an initial driving voltage to the alternating current generator, said battery having an S-terminal;

an ignition switch for driving an engine of a vehicle;

an initial excitation current supply transistor for supplying an initial excitation current; and a lamp driving controller for controlling a current of the lamp driving transistor of the lamp driving unit, wherein said lamp driving controller includes:

a current detection resistor connected to the emitter of the lamp driving transistor for detecting a lamp driving current of the transistor when said L-terminal and said S-terminal are reversely connected; and a thyristor having a gate to which a voltage is supplied for urging the voltage of the battery of the S-terminal to be supplied to the ground in accordance with the voltage supplied to the gate when an over-current is detected in the lamp driving transistor by the current detection resistor.

* * * * *